UNITED STATES PATENT OFFICE.

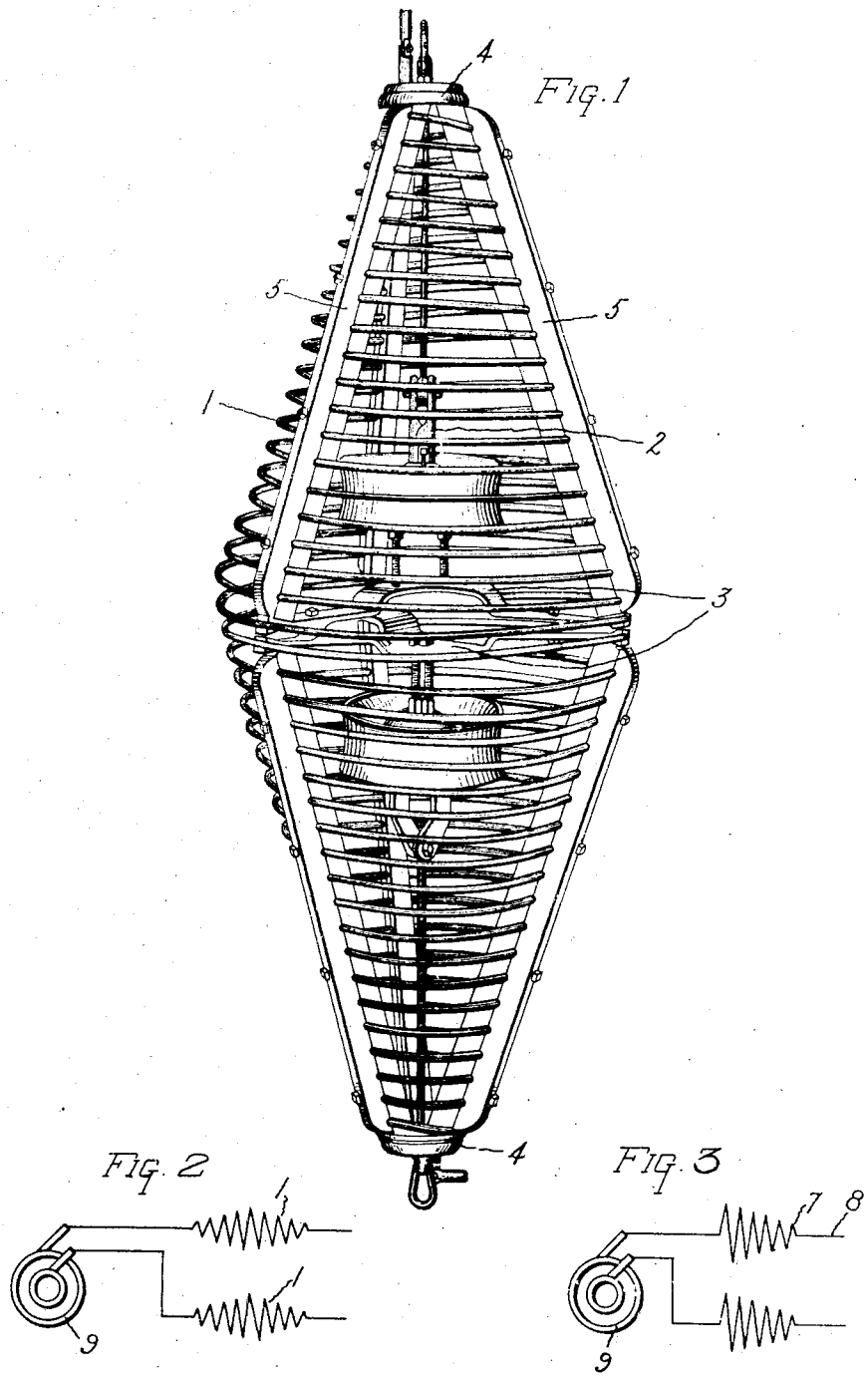

WALTER S. MOODY, OF PITTSFIELD, MASSACHUSETTS, ASSIGNOR TO GENERAL ELECTRIC COMPANY, A CORPORATION OF NEW YORK.

REACTIVE COIL.

1,132,281.     Specification of Letters Patent.     Patented Mar. 16, 1915.

Application filed July 11, 1912. Serial No. 708,642.

*To all whom it may concern:*

Be it known that I, WALTER S. MOODY, a citizen of the United States, residing at Pittsfield, county of Berkshire, State of Massachusetts, have invented certain new and useful Improvements in Reactive Coils, of which the following is a specification.

My invention relates to reactive coils and the object of my invention is to provide better coils and better arrangements thereof than have heretofore been used.

Reactive coils are used, in general, in systems of distribution to protect some part of the system from high potentials originating on other parts of the system. I propose to construct the reactive coil, in its most complete form, in the shape of two cones joined at their bases, such a coil absorbing more equally throughout a greater portion of itself than do the coils in use prior to my invention, an electromotive force suddenly impressed on it. Where the end turns of a reactive coil are of a maximum diameter, as has been the practice, the increasing electromotive force suddenly meets the maximum resistance, since, as is well understood, the greater the radius of curvature of a turn, the greater the resistance offered by it to an increasing potential by reason of its reactance. Where my invention is used, however, the resistance first presented to the electromotive force is small, gradually increasing as the electromotive force passes farther into the coil. The stresses are, therefore, more equally distributed throughout a greater portion of the coil, there is less tendency for a few turns to move together and less tendency for arcing between turns. The action of an electromotive force suddenly impressed on a coil such as I propose, may be described as similar to the action of an ocean wave striking a sloping beach where the force of the wave is gradually dissipated as the wave rolls up the beach. When a wave strikes a vertical cliff, however, the arresting of the force of the wave is sudden, as is the arresting of an electromotive force wave by a coil presenting its maximum diameter turns to the wave first.

When a reactive coil is to be used to protect a piece of apparatus from disturbances which may be expected to occur on only one side of that apparatus, the reactive coil may be simplified by making it in the shape of a single cone, in which case the installation should be made in such a way that the apex of the cone is connected to that side of the system on which the disturbances may be expected to occur.

Figure 1 shows in elevation a reactive coil involving my invention; Fig. 2 illustrates diagrammatically the use of two such coils to protect a generator; Fig. 3 illustrates diagrammatically the use of the simplified form of coil to protect a generator.

As shown in Fig. 1, the coil 1 is so constructed as to represent two cones jointed at their bases. To support this coil and fasten its ends securely together, I have provided a strain insulator 2 which may be of any desired form and construction, though I prefer the construction shown, placed within the coil. As a part of this support I have provided the members 3 which connect the center of the coil to the insulator and thereby help to fix the coil thereto. The coil is likewise connected to the insulator by the caps 4 at each end of the coil. Whenever this coil is inserted in a line, the longitudinal strain of the line on the coil will be carried by the insulator and the relation of the turns to each other will be unchanged by the tensional strain of the line. When current is passing through such a coil, the various turns have some tendency to move together and shorten the distances between themselves, although this tendency is not so evident in a coil of the form I have proposed as in the coils heretofore known. This may lead to the short circuiting of the turns, or to arcing between them. To prevent this action various provisions may be made. I prefer to provide insulating bars 5 carrying turns of the coil through separate openings. For ease of construction each bar may be made of two members bolted together as shown in the drawings. Such a coil may be connected into any part of the system of distribution, for example, as shown in Fig. 2, and will hold its shape under considerable mechanical and electrical stresses. The supporting insulator and insulating bars, being provided for the purposes indicated, may be dispensed with wherever they are not required. Any abnormalities to be absorbed by the coil, originating on either side of it, will be absorbed more gradually by a coil of the shape indicated than by the coils heretofore known, since the coil presents, from the end to the center, a gradually increasing resistance to an electromotive force wave from either direction. As is well known, the length of a turn, and hence its radius, is a factor of its self inductance and resistance to a passing wave. By gradually increasing the radii of curvature, a gradually increasing resistance is produced.

When abnormal tendencies may be expected from only one direction, the coil may be constructed of the shape shown in Fig. 3, a single cone. The apex 7 thereof should be connected to the side 8 of the system on which the abnormal tendencies may be expected to originate; for example, the coil in Fig. 3 is used to protect the generator 9 from disturbances occurring at 8 or beyond. Such a coil may or may not be provided with either or both the supporting insulator and the means for maintaining the proper relation of the turns to each other as desired.

What I claim as new and desire to secure by Letters Patent of the United States, is:—

1. The combination with a system of distribution, of a reactive coil in one lead thereof, the radius of curvature of a turn of the reactive coil near one end being less than the radius of curvature of a turn situated farther from that end, said mentioned end of the coil being connected to that part of the system on which the disturbances to be protected against by the coil may be expected to occur.

2. The combination with a system of distribution, of electrical apparatus connected thereto and a reactive coil connected between the apparatus and a part of the system on which disturbances may be expected to occur, the radii of curvature of the turns of the reactive coil increasing from the end connected to that part of the system.

3. A reactive coil having a plurality of turns, the turns near the center of said coil having greater radii of curvature than the turns nearer the ends of said coil.

4. A reactive coil having a plurality of turns the radii of curvature of which increase from the ends toward the center.

5. The combination with a reactive coil in the shape of a double cone with bases adjoining, of means for maintaining the spacing of turns of said coil comprising a plurality of bars secured to the several turns and insulating means within the coil connecting its two ends securely together.

In witness whereof, I have hereunto set my hand this 9th day of July 1912.

WALTER S. MOODY.

Witnesses:
G. FACCIOLI,
C. R. BLAKELY.

Copies of this patent may be obtained for five cents each, by addressing the "Commissioner of Patents, Washington, D. C."